United States Patent
Bhide et al.

(10) Patent No.: US 8,589,384 B2
(45) Date of Patent: Nov. 19, 2013

(54) METHODS AND ARRANGEMENTS FOR EMPLOYING DESCRIPTORS FOR AGENT-CUSTOMER INTERACTIONS

(75) Inventors: Manish Anand Bhide, New Delhi (IN); Om Dadaji Deshmukh, New Delhi (IN); Ashish Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 12/868,282

(22) Filed: Aug. 25, 2010

(65) Prior Publication Data

US 2012/0054186 A1 Mar. 1, 2012

(51) Int. Cl.
*G06F 7/00* (2006.01)
*G06F 17/30* (2006.01)

(52) U.S. Cl.
USPC ............ 707/722; 707/736; 707/737; 707/754

(58) Field of Classification Search
USPC .......................... 707/705, 722, 736, 737, 754
See application file for complete search history.

(56) References Cited

U.S. PATENT DOCUMENTS

| | | | |
|---|---|---|---|
| 6,014,647 A * | 1/2000 | Nizzari et al. ................. | 705/39 |
| 6,970,554 B1 | 11/2005 | Peterson et al. | |
| 7,013,263 B1 | 3/2006 | Isaka et al. | |
| 7,593,904 B1 * | 9/2009 | Kirshenbaum et al. ......... | 706/12 |
| 7,953,219 B2 * | 5/2011 | Freedman et al. ....... | 379/265.06 |
| 2001/0014143 A1 | 8/2001 | Kuhn | |
| 2005/0043986 A1 * | 2/2005 | McConnell et al. ............ | 705/11 |
| 2005/0047583 A1 * | 3/2005 | Sumner et al. ........... | 379/265.12 |
| 2005/0060532 A1 * | 3/2005 | Dorenbosch et al. ......... | 713/100 |
| 2006/0126818 A1 * | 6/2006 | Berger et al. ............ | 379/265.09 |
| 2006/0256953 A1 * | 11/2006 | Pulaski et al. ........... | 379/265.06 |
| 2007/0198323 A1 | 8/2007 | Bourne et al. | |
| 2007/0230682 A1 * | 10/2007 | Meghan et al. .......... | 379/265.06 |
| 2008/0152122 A1 | 6/2008 | Idan et al. | |
| 2008/0262904 A1 | 10/2008 | Conway et al. | |
| 2009/0012826 A1 * | 1/2009 | Eilam et al. ....................... | 705/7 |
| 2009/0150152 A1 | 6/2009 | Wasserblat et al. | |
| 2010/0246799 A1 * | 9/2010 | Lubowich et al. ....... | 379/265.09 |

FOREIGN PATENT DOCUMENTS

WO 01/52510 7/2001

OTHER PUBLICATIONS

Call Recording and Quality Management Handbook for Small- to Medium-Sized Contact Centers. Available at http://www.vpi-corp.com/resources/whitepapers/ The_Pelorus_Group_Call_Recording_and_QM_Handbook_for_Small-_to_Medium_Contact_Centers.pdf, date: Apr. 2010.
Veritape Call Tagging, Available at http://www.veritape.com.
Call Recording Software for Unified Quality and Performance Optimization, available at http://blog.vpi-corp.com/blog/business-centric-quality-monitoring, date: 2008.
VPI Empower Contact Center Recording and Workforce Optimization Software Solution Wins Prestigious Product of the Year Award From Customer Interaction Solutions® Magazine. Available at http://blog.vpi-oorp.com/blog/call-center-quality-assurance, date: Apr. 2010.

* cited by examiner

*Primary Examiner* — Hares Jami
(74) *Attorney, Agent, or Firm* — Ference & Associates LLC

(57) ABSTRACT

Methods and arrangements for employing descriptors for agent-customer interactions are disclosed. Filtering the pooled records based on one or more predetermined criteria is done such that analyzing the filtered records and comparing one interaction between an agent and a customer with another interaction between an agent and a customer may occur.

20 Claims, 3 Drawing Sheets

_US 8,589,384 B2_

METHODS AND ARRANGEMENTS FOR EMPLOYING DESCRIPTORS FOR AGENT-CUSTOMER INTERACTIONS

BACKGROUND

Generally, in a typical customer contact center or call center, various aspects related to the performance, efficiency and quality of the contact center are evaluated and monitored manually via a sample cross-section of agent-customer interactions. These interactions are typically a combination of real-time and non-real time (e.g., tape recorded) interactions as well as voice and text-based interactions (to the extent that the contact center handles one or the other of voice and text customer communication, or both).

Due to the limited available pool of expert human assessors who can analyze and evaluate these interactions, the typical sample size used for these evaluations is a tiny proportion of the overall call volume. Moreover, the interactions chosen for evaluation and analysis are randomly sampled from the entire call traffic. A number of important decisions about the contact center operations such as agent training, process modification to improve efficiency/quality, call routing and client feedback, among others, are made based on the analysis of these highly limited samples of interactions. Thus, the sample of interactions chosen for the analysis plays an important role and should assuredly represent a fair picture of the variety of interactions conducted at the contact center and of the particular aspect being evaluated.

For example, if the performance of two agents is to be compared based on the calls they handle then it is only fair to expect that the type of calls selected from the two agents should match in complexity, call type and customer experience. This can be a non-trivial task especially if the two agents work across different time shifts and/or on different days.

Similarly, performance evaluation of two units of a contact center can be misleading if the customer interactions from the two units are randomly selected without ensuring that they match on some critical aspects of the interactions such "agent vintage" (experience/longevity of the agent), "type of customer", "typical nature of the interactions" and so on. In short, a random sampling of interactions to evaluate a variety of aspects of a contact center, as is being done conventionally, can be a highly unreliable and misleading exercise.

BRIEF SUMMARY

In summary, one aspect of the invention provides a method comprising: obtaining a record of an interaction between an agent and a customer; categorizing the record with one or more characterizing descriptors; pooling the record with other records of interactions between an agent and a customer; filtering the pooled records based on one or more predetermined criteria; and analyzing the filtered records and comparing one interaction between an agent and a customer with another interaction between an agent and a customer.

Another aspect of the invention provides an apparatus comprising: one or more processors; and a computer readable storage medium having computer readable program code embodied therewith and executable by the one or more processors, the computer readable program code comprising: computer readable program code configured to define a plurality of personae for a device, each persona according variable access responsive to different access criteria; computer readable program code configured to obtain a record of an interaction between an agent and a customer; computer readable program code configured to categorize the record with one or more characterizing descriptors; computer readable program code configured to pool the record with other records of interactions between an agent and a customer; computer readable program code configured to filter the pooled records based on one or more predetermined criteria; and computer readable program code configured to analyze the filtered records and comparing one interaction between an agent and a customer with another interaction between an agent and a customer.

An additional aspect of the invention provides a computer program product comprising: a computer readable storage medium having computer readable program code embodied therewith, the computer readable program code comprising: computer readable program code configured to obtain a record of an interaction between an agent and a customer; computer readable program code configured to categorize the record with one or more characterizing descriptors; computer readable program code configured to pool the record with other records of interactions between an agent and a customer; computer readable program code configured to filter the pooled records based on one or more predetermined criteria; and computer readable program code configured to analyze the filtered records and comparing one interaction between an agent and a customer with another interaction between an agent and a customer.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
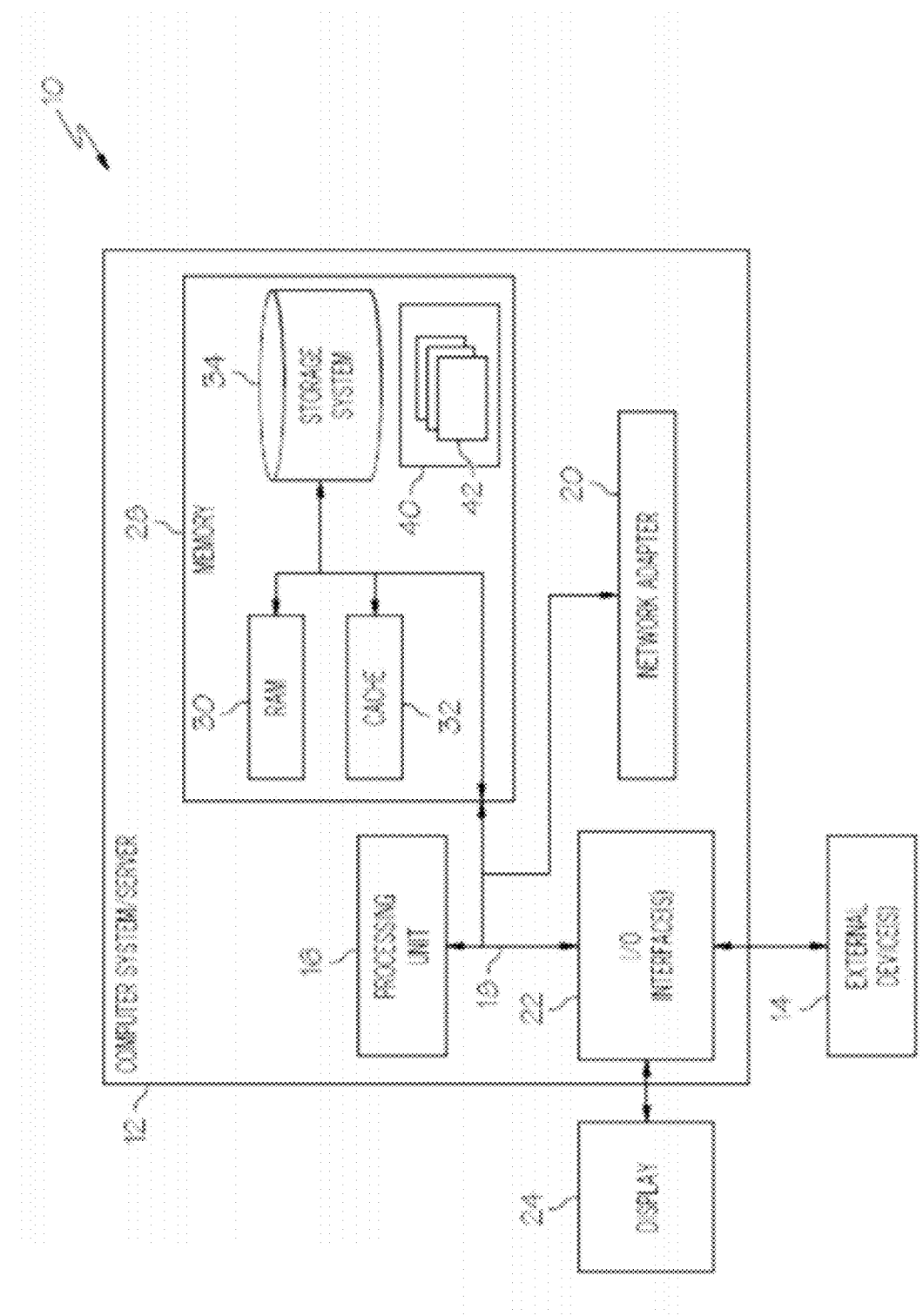
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
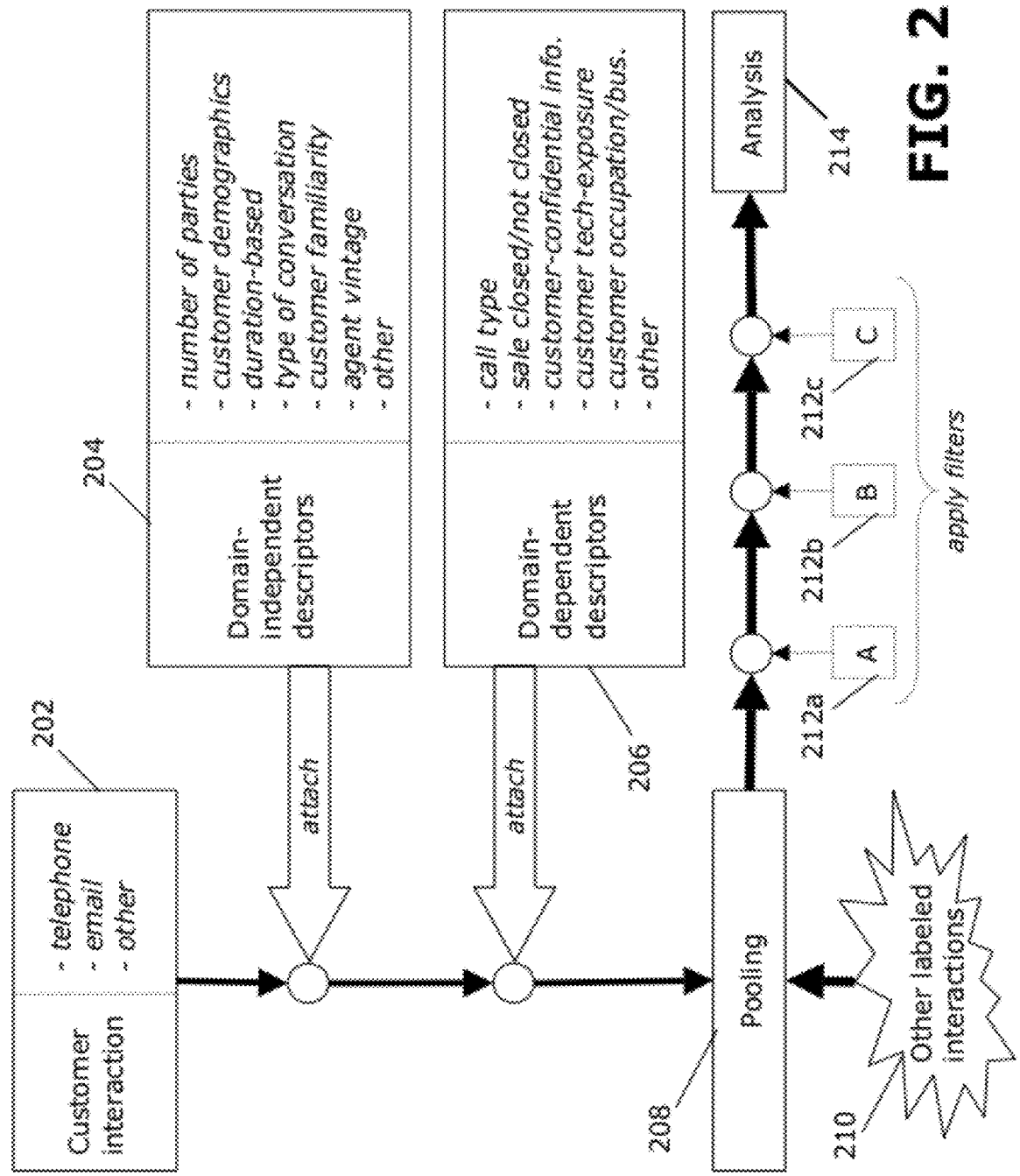
FIG. 2 schematically illustrates an arrangement for analysis of customer interactions FIG. 3 sets forth a process more generally for analyzing agent-customer interactions.

The disclosure now turns to FIG. 2. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIG. 2 can be performed or utilized by way of a processing unit or units and system memory such as those indicated, respectively, at 16 and 28 in FIG. 1, whether on a server computer, a client computer, a node computer in a distributed network, or any combination thereof.

In contrast to the disadvantages and shortcomings presented by conventional efforts, there are broadly contemplated herein, in accordance with at least one embodiment of the present invention, methods and arrangements which provide a smarter analysis and evaluation of contact center operations such that the interactions used for evaluation are sampled based on types of interaction descriptors and as such are not necessarily purely randomly sampled.

FIG. 2 schematically illustrates an arrangement for analysis of customer interactions in accordance with at least one embodiment of the invention. Indicated at 202 is a customer interaction, or an interaction between an agent and a customer. The interaction may be via telephone, email or other media such as written chat. Though much of the discussion here throughout focuses on telephonic agent-customer interaction, it should be understood that agent-customer interactions other than telephonic are contemplated and can indeed be addressed by variants of aspects of at least one embodiment of the invention.

In accordance with at least one embodiment of the invention, interaction 202 is labeled on a series of domain-independent (204) and domain-dependent (206) descriptors which capture relevant aspects of the interaction. For example, in a financial domain a "call type" descriptor could include values such as credit card, bank account, home loan, etc. It may also contain a finer level of description such as "incorrect home loan interest rate charged", etc. Domain independent descriptors are independent of any particular domain and would characterize general features of the interaction, such as, length of the interaction, normal discussion or dispute, number of persons involved in the interaction and so on. These descriptors can be extracted either by analyzing the interaction data, which may include using text/speech processing techniques, or can be derived from the metadata associated with the interaction or both.

To give an example of a extracting a descriptor, one may use speaker segmentation techniques based on speech processing to find out how many persons are involved in an interaction. Similarly, one can apply text processing techniques (in the case of audio interaction, the audio can be converted to text using automatic speech recognition techniques) to find out the call type and other descriptors.

Accordingly, in accordance with at least one embodiment of the invention, one or more labels based on domain-independent descriptors 204 and/or one or more labels based on domain-dependent descriptors are essentially attached to a file (e.g., an audio file for a phone call or an email file) associated with the customer interaction to assist in further analysis.

In a manner to be further understood and appreciated herebelow, in accordance with at least one embodiment of the invention, any of a variety of domain-independent (204) and/or domain-dependent (206) descriptors can be attached to a customer interaction 202, whereupon the labeled interaction is pooled (208) with other labeled interactions. These can then be filtered by essentially any number of filters (three are shown in the present example, 212*a/b/c*), which could be based on essentially any desired criteria including any domain-independent (204) and/or domain-dependent (206) descriptor(s) so that a limited number of customer interactions can be analyzed (214) by way of eliciting performance comparisons between among those interactions (and, by extension, comparisons of agent performance).

Accordingly, in accordance with at least one embodiment of the invention, to evaluate a particular aspect of a contact center or other workplace (two different agents or two different days, e.g.), interactions are sampled in such a way that there is equal representation of the descriptors that are most relevant for the aspect(s) being evaluated or, when the comparison is being done, the distribution of the various descriptors is taken into account.

Consider a scenario where the performance of two agents of a technical help-desk contact center is being evaluated. Further, if one makes the reasonable assumption that tech-savvy users typically call in after hours whereas tech-novice users typically call during the day-time, then it can reasonably be surmised that the average duration of calls handled during the after hours can be much shorter than the calls handled during the daytime and the FCR rate (First Contact Resolution, i.e., the percentage of calls where a problem is resolved in the first call) can be observably higher for the after-hours calls. A random sampling of calls without accounting for this skew can adversely affect the evaluation of an agent who works in the day-shift as compared to an agent who works in the late evening shift. Moreover, conclusions drawn about the day-time call-handling mechanism can be unreliable and misleading.

Now, consider a scenario where every call handled at the above-mentioned technical help-desk contact center is automatically labeled with descriptors such as "technical exposure of the customer", "total duration of each turn and its variation over time", "customer demographics" (such as speaking speed, accent of the customer and the style of conversation) and so on. The first descriptor can capture the proportion of tech-savvy vs. tech-novice customers handled by various agents, the second descriptor can capture the amount of time it took the customer to explain his/her problem, and/or the amount of time the agent spent in either exploring a solution or assisting the customer, etc. The third descriptor, "customer demographics", can capture information about the typical customer base the contact center caters to and how it varies across time-shifts and across the different days of the week. A fair comparison of two agents can thus now be easily conducted by selecting equal numbers of calls from each of these descriptors.

Consider a different scenario where a company catering mainly to a particular geography (e.g., Scotland) has delegated its contact center operations to two different contact centers, wherein the first one caters mainly to customers that have had more previous experience with calling in (and thus are more familiar with the process), and/or have a more comprehensible accent, and the second one handles the rest of the calls. Because of a more comprehensible accent and/or more previous experience in navigating the process, customers in the first category are more likely to resolve matters with an agent more quickly as compared to the customers in the second category. Thus, a random sampling of the calls across the two contact centers can, in the absence of mitigating explanations, lead to a misleading conclusion that the agents in the second contact center generally are less efficient, e.g., are less able to handle foreign accents or efficiently handle customers in general, than those from the first contact center.

Such a conclusion is not only wrong and presumptive, but can also lead to a significant and unnecessary expense on such efforts as accent-training exercises of the agents. In other words, without any available knowledge of the typical accents or thickness of accents encountered in one contact center or another, it might be misleadingly surmised that agents in the first mentioned center inherently are better prepared to handle certain accents or thicknesses of accents than agents in the second mentioned center, whereas the actual differences in agent performance in fact are tied to aggregated characteristics of the callers themselves at each center and not to inherent abilities of the agents. Similar misleading conclusions can be derived in the absence of mitigating knowledge about the previous calling-in experience of different customers.

The scenario can now be considered where every call handled is labeled on the basis of descriptors such as "customer demographics", which indeed can include a customer's accent and/or at least a qualitative measure of the thickness of the accent. Accordingly, to factor in this descriptor while comparing calls across the contact centers can indeed lead to a fair and reliable comparison.

Thus, to ensure fairness of the evaluation of the operations of a contact center and the reliability of the recommendations of the analysis, the interactions, in accordance with at least one embodiment of the invention, are chosen (e.g., via filters such as at 212a/b/c/) such that they counter any bias/skew present in the call traffic. This, again, can be ensured by labeling every interaction 202 on the basis of a set of domain-independent (204) and domain-dependent (206) descriptors and choosing a balanced representation of calls from each of the relevant interaction descriptors for analysis and evaluation of the contact center operations.

Domain-independent descriptors, 204 essentially can be assigned to every interaction irrespective of the domain (e.g., technical help vs. automotive vs. finance, etc.) and domain-dependent descriptors 206 essentially are specific to a particular domain (e.g., "tech-savvy" may be more relevant for a technical help desk domain than for a finance domain).

Domain-independent descriptors (204) can include, but by no means are limited to:

The number of parties in the interaction. This can indicate call transfer, escalation (e.g., switching a call from an agent to a supervisor), switch over to/from a tech-novice customer from/to a tech-savvy customer, etc.

Customer demographics: This can capture, e.g., the speaking speed and accent of the customer as well as the style of conversation. Each of these aspects can have a significant impact on the contact-resolution rate and/or any other dimension of the contact center operation.

Duration-based descriptors. These can include the duration of each turn, (where "turn" means the duration when a single speaker is speaking before the other speaker starts, or in case of email/chat, the amount of text by one person at a time) and its variation over time, number of turns, number of transfers, duration of each part of the transfer and the duration of hold time or "dead-air" time in the calls. These descriptors capture information about escalations, agent-preparedness, availability of subject-matter-experts, etc.

Type of conversation. This can include whether the call was a routine Q/A call, argument/excitement, between two agents as opposed to between a agent-customer and so on. (For instance, two agents may be communicating where one may be taking advice or accepting help from a colleague or supervisor.) For a written interaction, such as email/chat, the presence of all-capitals or other telltale writing conventions can provide an indication of the customer's state of mind.

Customer familiarity with the product. This descriptor can have a direct impact on customer-satisfaction, contact-resolution and other similar critical aspects of the contact center operations.

Agent "vintage". When comparing operations across two different contact centers, the average experience of agents across the two units can be a deciding factor. Even in other analyses, agent experience can play an important role.

Domain-dependent descriptors 206 can include, but by no means are limited to:

Call type. The options here can vary based on the domain

Sale closed/not closed. This can be a relevant descriptor in domains that include cross-sell/up-sell opportunities.

Presence of customer-confidential information. This can include a customer's health-related information, his/her credit card details, SSN, etc.

Tech-exposure of the customer. This can be particularly relevant for the technical domain.

Customer's occupation and/or the nature of his/her business. This can be particularly relevant for, e.g., the automotive and finance domains.

A smarter sampling of the interactions can be enabled by ensuring that the value of the selected descriptors (both domain-dependent and domain-independent) is uniform in the samples. For example, to analyze the cause of escalations, instead of randomly sampling all the calls received at the center a smart approach would be to pick a random subset of calls with the descriptor "two or more parties". Similarly, to analyze the various call types or reasons where agents needed assistance, a random sampling of calls with the descriptor "high proportion of hold time/dead-air" can be more appropriate instead of a random sampling of the entire set of calls. Each of these constraints, or any constraint, essentially can be applied as a filter 212a/b/c as mentioned hereinabove.

It should be noted that, in accordance with at least one embodiment of the invention, a solution involved is not simply about tagging interaction using interaction descriptors, but also includes facilitating smarter analysis of call center operations by sampling the calls such that distribution of interactions descriptors is similar across the analysis sample set.

To further appreciate advantages associated with at least one embodiment of the invention, conventional arrangements often involve a routine sampling of agent-customer interactions for routine quality monitoring. Surveys for customer satisfaction feedback can conventionally be performed by randomly sampling a subset of customers who have called in. A rudimentary set of meta-data can be used for any call center analysis, such as, AHT (average handling time), the number of dropped calls, and other factors. As noted, however, this can prove to be unreliable in terms of comparing agent-customer interactions that are dissimilar in their characteristics.

In contrast, in accordance with at least one embodiment of the present invention, an advanced set of agent-customer interaction descriptors can be extracted by deep analysis of the interactions and customer and agent information. A smart sampling of agent-customer interactions for analyzing the operations of a given locale or set of agents can yield better results and interpretation.

In brief recapitulation, there are broadly contemplated herein, in accordance with at least one embodiment of the invention, systems and methods for smarter analysis of call center operations using interaction descriptors. One or more samples are selected such that the distribution of one or more interaction descriptors is similar across the samples. A systematic tagging of an interaction on a set of common descriptive dimensions is employed. A balanced across-account evaluation of a contact or call center, or other employment locale or arena, can result as well as a balanced evaluation of agents employed therein. The descriptors include domain-dependent as well as domain-independent dimensions.

Figure 3:
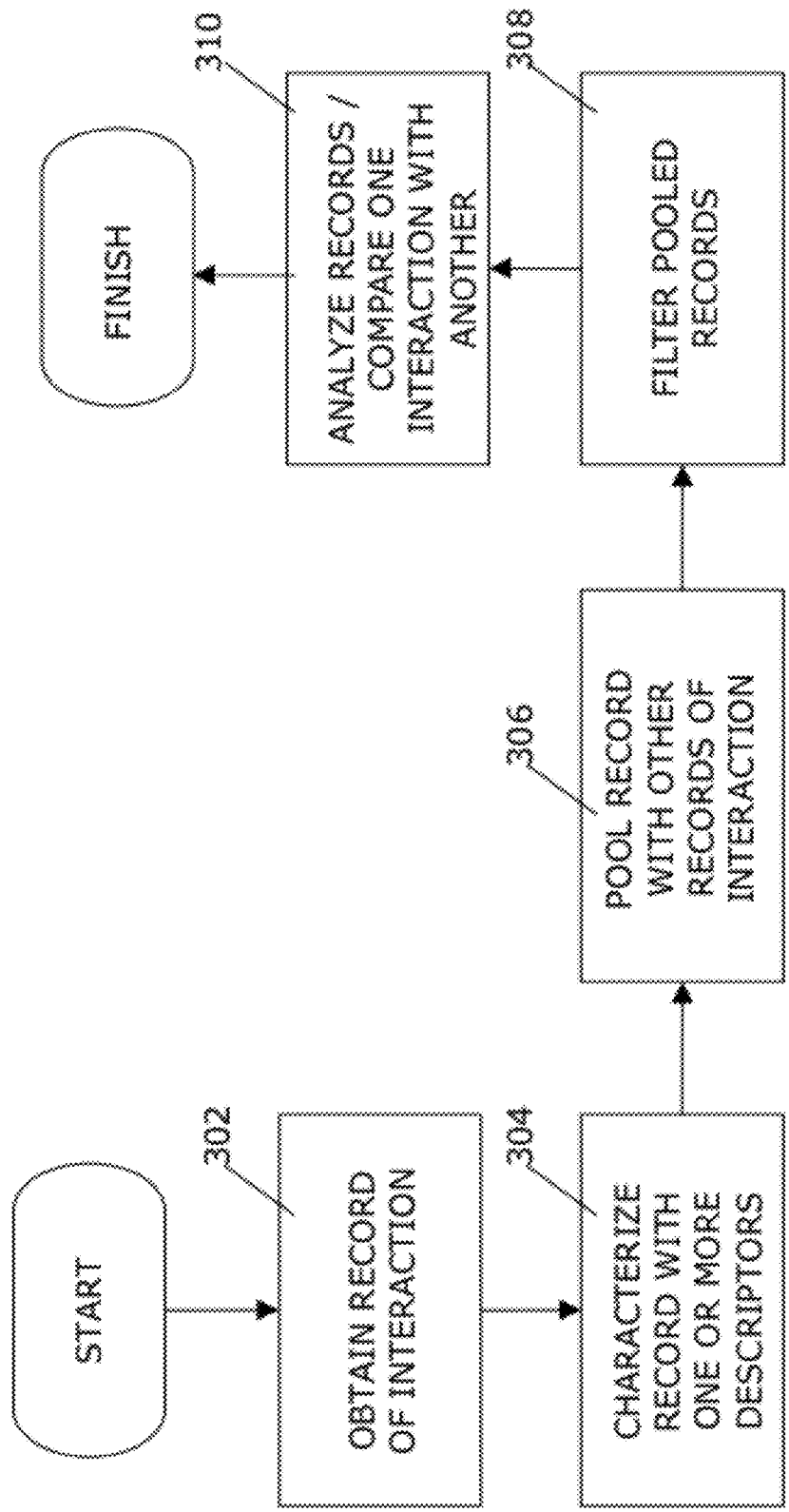

FIG. 3 sets forth a process more generally for analyzing agent-customer interactions in accordance with at least one embodiment of the invention. It should be appreciated that a process such as that broadly illustrated in FIG. 3 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 3 can be performed by way a processing unit or units and system memory such as those indicated, respectively, at 16 and 28 in FIG. 1.

As shown in FIG. 3, a record of an interaction between an agent and a customer is obtained (302), and the record is categorized with one or more characterizing descriptors (304). The record is pooled with other records of interactions between an agent and a customer (306). The pooled records are filtered based on one or more predetermined criteria (308) and the filtered records are analyzed, with one interaction between an agent and a customer compared with another interaction between an agent and a customer (310).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:

executing with one or more processors one or more modules of computer program code configured for obtaining a record of an agent-customer interaction;

categorizing the record with one or more characterizing descriptors, wherein the descriptors comprise at least one characterization of at least one member selected from the group consisting of an agent in the agent-customer interaction; a customer in the agent-customer interaction; a manner of interaction between the agent and customer in the agent-customer interaction; and a detail of interaction between the agent and customer in the agent-customer interaction;

pooling the record with other records of agent-customer interaction;

filtering the pooled records via applying at least one filter related to one or more of the one or more characterizing descriptors, and thereby reducing the number of pooled records to a comparison pool having a smaller number of records; and within the comparison pool of records, analyzing the records and comparing one agent-customer interaction with another agent-customer interaction.

2. The method according to claim 1, further comprising extracting a characterizing descriptor via analyzing an agent-customer interaction.

3. The method according to claim 1, further comprising extracting a characterizing descriptor via analyzing metadata associated with an agent-customer interaction.

4. The method according to claim 1, wherein said filtering comprises filtering the pooled records based on one or more characterizing descriptors which have similar values with respect to interactions being compared.

5. The method according to claim 1, wherein said obtaining comprises obtaining one taken from the group consisting of: a record of telephonic interaction between an agent and a customer; and a record of written electronic interaction between an agent and a customer.

6. The method according to claim 1, wherein said categorizing comprises categorizing the record with one or more domain-independent descriptors.

7. The method according to claim 6, wherein the one or more domain-independent descriptors are taken from the group consisting of: number of parties in the interaction; customer demographics; a duration-based parameter; type of conversation in the interaction; customer familiarity with a product; agent experience.

8. The method according to claim 1, wherein said categorizing comprises categorizing the record with one or more domain-dependent descriptors.

9. The method according to claim 8, wherein the one or more domain-dependent descriptors are taken from the group consisting of: a type of phone call characterizing the interaction; an indication of whether a sale was closed in the interaction; customer-confidential information; information on customer occupation or business.

10. The method according to claim 1, wherein said filtering comprises filtering the pooled records based on one or more predetermined criteria related to one or more of the characterizing descriptors.

11. An apparatus comprising:

one or more processors; and a computer readable storage medium having computer readable program code embodied therewith and executable by the one or more processors, the computer readable program code comprising:

computer readable program code configured to obtain a record of an agent-customer interaction;

computer readable program code configured to categorize the record with one or more characterizing descriptors, wherein the descriptors comprise at least one characterization of at least one member selected from the group consisting of: an agent in the agent-customer interaction; a customer in the agent-customer interaction; a manner of interaction between the agent and customer in the agent-customer interaction; and a detail of interaction between the agent and customer in the agent-customer interaction;

computer readable program code configured to pool the record with other records of agent-customer interactions;

computer readable program code configured to filter the pooled records via applying at least one filter related to one or more of the one or more characterizing descriptors, and thereby reduce the number of pooled records to a comparison pool having a smaller number of records; and computer readable program code configured to, within the comparison pool of records, analyze the records and compare one agent-customer interaction with another agent-customer interaction.

12. A computer program product comprising:

a non-transitory computer readable storage medium having computer readable program code embodied therewith, the computer readable program code comprising:

computer readable program code configured to obtain a record of an agent-customer interaction;

computer readable program code configured to categorize the record with one or more characterizing descriptors, wherein the descriptors comprise at least one characterization of at least one member selected from the group consisting of: an agent in the agent-customer interaction; a customer in the agent-customer interaction; a manner of interaction between the agent and customer in the agent-customer interaction; and a detail of interaction between the agent and customer in the agent-customer interaction;

computer readable program code configured to pool the record with other records of agent-customer interactions;

computer readable program code configured to filter the pooled records via applying at least one filter related to one or more of the one or more characterizing descriptors, and thereby reduce the number of pooled records to a comparison pool having a smaller number of records; and computer readable program code configured to, within the comparison pool of records, analyze the records and compare one agent-customer interaction with another agent-customer interaction.

13. The computer program product according to claim 12, further comprising computer readable program code configured to extract one taken from the group consisting of: a characterizing descriptor via analyzing an agent-customer interaction; and a characterizing descriptor via analyzing metadata associated with an agent-customer interaction.

14. The computer program product according to claim 12, wherein said computer readable program code is configured to filter the pooled records based on one or more characterizing descriptors which have similar values with respect to interactions being compared.

15. The computer program product according to claim 12, wherein said computer readable program code is configured to obtain one taken from the group consisting of: a record of telephonic interaction between an agent and a customer; and a record of written electronic interaction between an agent and a customer.

16. The computer program product according to claim 12, wherein said computer readable program code is configured to categorize the record with one or more domain-independent descriptors.

17. The computer program product according to claim 16, wherein the one or more domain-independent descriptors are taken from the group consisting of: number of parties in the interaction; customer demographics; a duration-based parameter; type of conversation in the interaction; customer familiarity with a product; agent experience.

18. The computer program product according to claim 12, wherein said computer readable program code is configured to categorize the record with one or more domain-dependent descriptors.

19. The computer program product according to claim 18, wherein the one or more domain-dependent descriptors are taken from the group consisting of: a type of phone call characterizing the interaction; an indication of whether a sale was closed in the interaction; customer-confidential information; information on customer occupation or business.

20. The computer program product according to claim 12, wherein said computer readable program code is configured to filter the pooled records based on one or more predetermined criteria related to one or more of the characterizing descriptors.

* * * * *